(12) United States Patent
Li et al.

(10) Patent No.: US 11,741,914 B1
(45) Date of Patent: Aug. 29, 2023

(54) ARRAY SUBSTRATE AND DISPLAY PANEL

(71) Applicants: Huizhou China Star Optoelectronics Display Co., Ltd., Huizhou (CN); TCL China Star Optoelectronics Technology Co., Ltd., Shenzhen (CN)

(72) Inventors: Jie Li, Huizhou (CN); Zhixiang Chen, Shenzhen (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/876,207

(22) Filed: Jul. 28, 2022

(30) Foreign Application Priority Data

Jul. 14, 2022 (CN) .......................... 202210833491.2

(51) Int. Cl.
 *G09G 3/36* (2006.01)
(52) U.S. Cl.
 CPC ......... *G09G 3/3677* (2013.01); *G09G 3/3674* (2013.01); *G09G 2310/0202* (2013.01); *G09G 2310/0267* (2013.01); *G09G 2310/0286* (2013.01)
(58) Field of Classification Search
 CPC ......... G09G 2310/0286; G09G 3/3677; G09G 3/3674; G09G 2310/0267; G09G 2300/0408; G09G 3/20; G09G 3/3266; G09G 2320/0223; G09G 2300/0426; G06F 30/394
 See application file for complete search history.

(56) References Cited

U.S. PATENT DOCUMENTS

| | | | | |
|---|---|---|---|---|
| 10,840,270 B2 * | 11/2020 | Park | ..................... | G09G 3/3677 |
| 11,158,275 B2 * | 10/2021 | Shin | .................. | G02F 1/136286 |
| 11,257,455 B2 * | 2/2022 | Xiong | .................. | G09G 3/3677 |
| 11,322,110 B2 * | 5/2022 | Huang | ................. | G09G 3/3688 |
| 11,462,147 B2 * | 10/2022 | Gao | ..................... | G09G 3/2092 |

(Continued)

FOREIGN PATENT DOCUMENTS

| | | |
|---|---|---|
| CN | 107068084 | 8/2017 |
| CN | 109036316 | 12/2018 |

(Continued)

OTHER PUBLICATIONS

Notification of Office Action and Search Report dated Apr. 29, 2023 From the State Intellectual Property Office of the People's Republic of China Re. Application No. 202210833491.2 and Its Translation Into English. (19 Pages).

*Primary Examiner* — Dismery Mercedes

(57) ABSTRACT

An array substrate and a display panel are disclosed in an embodiment of the present application. The array substrate includes a plurality of GOA units in cascade and a plurality of clock signal lines. The plurality of clock signal lines are arranged on one side of the GOA units and are arranged at intervals along a direction away from the GOA units. The plurality of GOA units are electrically connected to the plurality of clock signal lines, respectively. Wherein, a number of the GOA units electrically connected to each of the clock signal lines is equal. The array substrate reduces a resistance difference and a capacitance difference between the plurality of clock signal lines and alleviates a problem of dense horizontal lines by adjusting a number of stages of the GOA units.

8 Claims, 4 Drawing Sheets

(56) References Cited

U.S. PATENT DOCUMENTS

| | | | |
|---|---|---|---|
| 11,605,359 B2* | 3/2023 | Nakagawa | G09G 3/3677 |
| 2012/0086627 A1* | 4/2012 | Chen | G09G 3/3677 |
| | | | 345/100 |
| 2012/0235983 A1* | 9/2012 | Sakamoto | G09G 3/3677 |
| | | | 345/212 |
| 2017/0200420 A1* | 7/2017 | No | G06F 13/1689 |
| 2020/0273417 A1* | 8/2020 | Zhao | G09G 3/3614 |
| 2021/0193023 A1* | 6/2021 | Zhao | G09G 3/20 |
| 2021/0295795 A1* | 9/2021 | Xiong | G09G 3/3677 |
| 2022/0114934 A1* | 4/2022 | He | G11C 19/28 |
| 2022/0114980 A1* | 4/2022 | Gao | G09G 3/3674 |
| 2022/0122503 A1* | 4/2022 | Xiao | G09G 3/2003 |

FOREIGN PATENT DOCUMENTS

| | | |
|---|---|---|
| CN | 111091792 | 5/2020 |
| CN | 111429856 | 7/2020 |
| CN | 113964136 | 1/2022 |
| CN | 114023241 | 2/2022 |

* cited by examiner

ARRAY SUBSTRATE AND DISPLAY PANEL

CROSS-REFERENCE TO RELATED APPLICATION

This application claims priority to a Chinese patent application with an application date of Jul. 14, 2022, an application number of 202210833491.2, and an application title of "ARRAY SUBSTRATE AND DISPLAY PANEL", which is incorporated by reference in the present application in its entirety.

BACKGROUND OF DISCLOSURE

Technical Field

The present application relates to a technical field of displays, and in particular, to an array substrate and a display panel.

Description of Prior Art

A gate driving circuit is on a thin film transistor (TFT) array substrate (gate driver on array (GOA)). That is to say, an existing array process is used to make the gate driving circuit on the TFT array substrate, so as to realize a driving mode of progressive scanning of a gate. This technology replaces a traditional gate integrated circuit (Gate-IC) for driving and saves production cost. The GOA circuit includes a GOA driving unit (circuit) and a bus line, wherein the bus line includes a plurality of clock (CK) signal lines and the like. Because a GOA technology has advantages of low cost, low power consumption, and a narrower frame, more and more panel manufacturers adopt the GOA technology for production.

With popularization of the GOA technology for liquid crystal panels, product resolution has changed from 4K to 8K, and a number of the CK signal lines of the GOA circuit has gradually increased (from 8 to 12). In an existing GOA circuit with 12 CK signal lines, last several levels of virtual GOA units play a role of pulling down effective GOA units, which are divided into 8 levels of virtual GOA-unit pull-down and 6 levels of virtual GOA-unit pull-down according to different pull-down methods. This design leads to a difference of capacitance and resistance of the 12 clock signal lines, that is, loads between the plurality of clock signal lines are different, resulting in a difference of resistance and capacitance between the 12 clock signal lines, which makes products have problems such as dense horizontal lines and the like.

BRIEF SUMMARY OF DISCLOSURE

An array substrate and a display panel are provided in the present application, which can reduce a resistance difference and a capacitance difference between a plurality of clock signal lines and alleviate a problem of dense horizontal lines by adjusting a number of stages of virtual GOA units.

On one aspect, an array substrate is provided in an embodiment of the present application and comprises: a plurality of GOA units in cascade; and a plurality of clock signal lines arranged on one side of the GOA units and arranged at intervals along a direction away from the GOA units, and the plurality of GOA units electrically connected to the plurality of clock signal lines, respectively; wherein a number of the GOA units electrically connected to each of the clock signal lines is equal.

Optionally, in some embodiments of the present application, at least one of the clock signal lines comprises a clock signal main line and a clock signal branch line corresponding to the clock signal main line; one end of the clock signal branch line is electrically connected to the corresponding clock signal main line, and another end of the clock signal branch line is electrically connected to a corresponding GOA unit.

Optionally, in some embodiments of the present application, the GOA units are electrically connected to at least one of the clock signal lines, and a number of the GOA units is N times of a number of the clock signal lines, and N is an integer greater than or equal to 1.

Optionally, in some embodiments of the present application, the plurality of GOA units comprise a plurality of virtual GOA units, a number of the virtual GOA units is equal to the number of the clock signal lines, and the virtual GOA units are connected to the clock signal lines in a one-to-one correspondence.

Optionally, in some embodiments of the present application, at least one of the clock signal lines further comprises a compensation branch line; one end of the compensation branch line is electrically connected to the corresponding clock signal branch line, and another end of the compensation branch line is electrically connected to the corresponding GOA unit.

Optionally, in some embodiments of the present application, a winding area is provided between the GOA units and the clock signal lines, and the compensation branch line is arranged in the winding area.

Optionally, in some embodiments of the present application, the compensation branch line comprises a first connecting section electrically connected to the corresponding clock signal branch line, a bending-connecting section, and a second connecting section electrically connected to the corresponding virtual GOA unit; and the bending-connecting section is arranged between the first connecting section and the second connecting sections.

Optionally, in some embodiments of the present application, a length of the plurality of clock signal branch lines is equal to a sum of lengths of the compensation branch lines.

Optionally, in some embodiments of the present application, the array substrate further comprises a plurality of capacitance compensation blocks, the plurality of capacitance compensation blocks are electrically connected to the plurality of clock signal lines and are used to compensate capacitance generated by the plurality of clock signal branch lines and an area directly opposite to lines in the GOA units, and/or capacitance generated by the plurality of clock signal branch lines and an area directly opposite to the clock signal main lines.

In another aspect, a display panel is further provided in the present application and comprises the above-mentioned array substrate and a color film substrate, and the color film substrate is arranged opposite to the array substrate.

The array substrate provided in the present application comprises: the plurality of GOA units in cascade and the plurality of clock signal lines, and the plurality of clock signal lines are arranged on one side of the GOA units and arranged at intervals along the direction away from the GOA units. The plurality of GOA units are electrically connected to the plurality of clock signal lines. Wherein the number of the GOA units electrically connected to each of the clock signal lines is equal. The array substrate provided by the present application adjusts stages of the GOA units to make the number of the GOA units electrically connected to each of the clock signal lines equal, thereby reducing a resistance difference and a capacitance difference between the plurality of clock signal lines, alleviating a problem of dense horizontal lines, and improving a display effect.

BRIEF DESCRIPTION OF DRAWINGS

In order to more clearly explain technical solution in embodiments of the present application, the following will briefly introduce the drawings that need to be used in description of the embodiments. The drawings in the following description are only some embodiments of the present application. For those skilled in the art, other drawings can be obtained according to these drawings without making creative work.

DETAILED DESCRIPTION OF PREFERRED EMBODIMENTS

Technical schemes in embodiments of the present application will be clearly and completely described below in combination with accompanying drawings in the embodiments of the present application. Obviously, the described embodiments are only part of the embodiments of the present application, not all of them. Based on the embodiments in this application, all other embodiments obtained by those skilled in the art without making creative work fall within a scope of protection of the present application.

An array substrate and a display panel are provided in the embodiments of the present application, which can reduce a resistance difference and a capacitance difference between a plurality of clock signal lines and alleviate a problem of dense horizontal lines by adjusting a number of stages of virtual GOA units. Following is a detailed description. It should be noted that an order of description of the following embodiments is not a limitation of a preferred order of the embodiments. In addition, in the description of the present application, the term "including" refers to "including but not limited to". The terms "first", "second", "third" and so on are used only as signs, which are used to distinguish different objects, not to describe a specific order.

Figure 1:
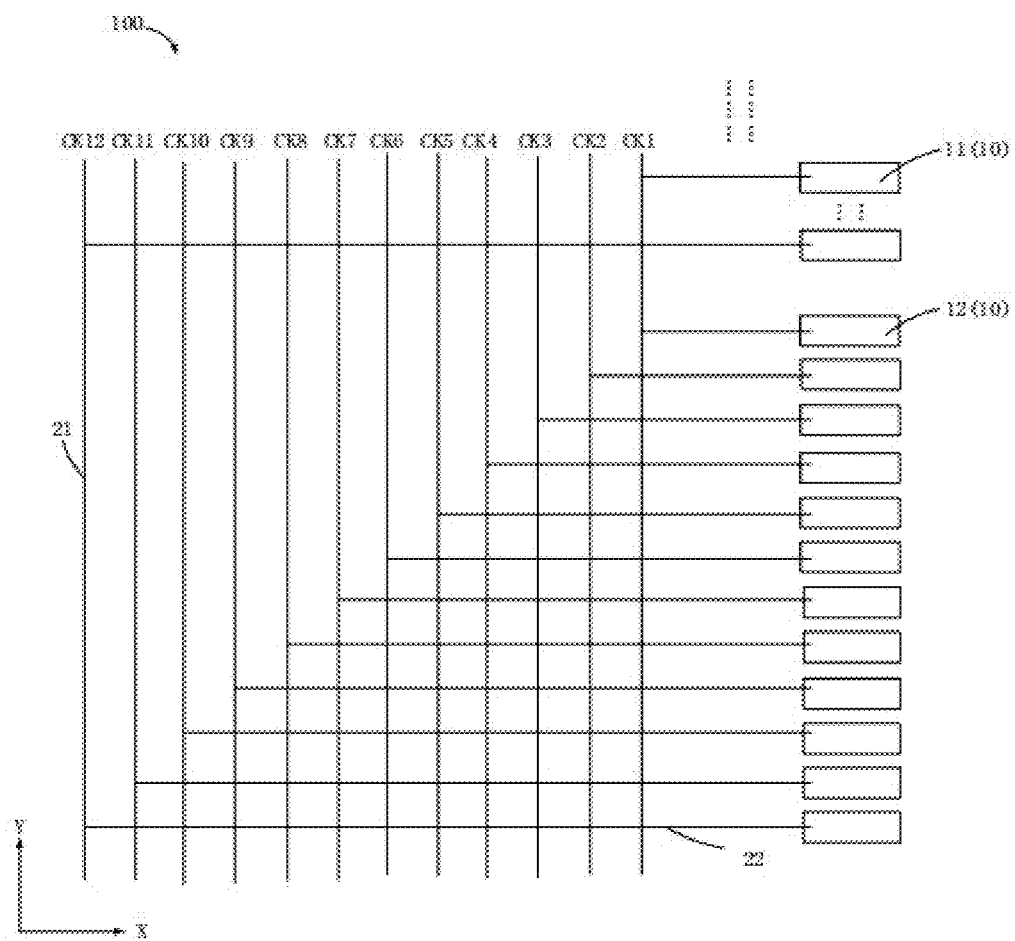
FIG. 1 is a first schematic structural diagram of an array substrate provided in a first embodiment of the present application.

Please refer to FIG. 1, FIG. 1 is a first schematic structural diagram of an array substrate provided in a first embodiment of the present application. As shown in FIG. 1, the array substrate 100 is provided in the embodiment and includes: a plurality of GOA units in cascade 10 and a plurality of clock signal lines CK. The plurality of clock signal lines CK are arranged on one side of the GOA units 10 and are arranged at intervals along a direction away from the GOA units 10. The plurality of GOA units 10 are electrically connected to the plurality of clock signal lines CK, respectively. Wherein, a number of the GOA units 10 electrically connected to each of the clock signal lines CK is equal.

In the embodiment of the present application, at least one of the clock signal lines CK includes a clock signal main line 21 and a clock signal branch line 22 corresponding to the clock signal main line 21. One end of the clock signal branch line 22 is electrically connected to the corresponding clock signal main line 21, and another end of the clock signal branch line 22 is electrically connected to a corresponding GOA unit 10.

Specifically, the array substrate 100 includes the plurality of clock signal lines CK arranged at intervals along the direction away from the GOA units 10. Wherein, the clock signal line CK includes the clock signal main line 21 and the clock signal branch line 22. The plurality of clock signal main lines 21 are arranged at intervals along a first direction x. Preferably, the plurality of clock signal main lines 21 are parallel to each other. The plurality of clock signal branch lines 22 corresponding to the plurality of clock signal main lines 21 are arranged at intervals along a second direction y. Preferably, the plurality of clock signal branch lines 22 are parallel to each other.

In the embodiment of the present application, the GOA units 10 are electrically connected to at least one of the clock signal lines CK. A number of the GOA units 10 is N times of a number of the clock signal lines CK, and N is an integer greater than or equal to 1. The GOA units 10 shown in FIG. 1 are connected to one clock signal line CK in a one-to-one correspondence. Wherein the GOA units 10 can also be electrically connected to the plurality of clock signal lines CK, which can be adjusted by those skilled in the art as needed and are not limited here in the present application. The number of the GOA units 10 is related to a display frequency and can be adjusted as needed. It is only needed to ensure that the number of the GOA units 10 electrically connected to each of the clock signal lines CK is consistent. Such a design is conducive to preventing a difference in capacitance and resistance between the clock signal lines CK due to different loads, and improving a matching degree of capacitance and resistance between the clock signal lines CK.

In the embodiment of the present application, the plurality of GOA units 10 include a plurality of effective GOA units 11, and each of the effective GOA units 11 is connected to at least one of the clock signal lines CK. Each effective GOA unit 11 is used to output a scanning signal based on a clock signal and other signals input by the clock signal lines CK. The scanning signal is loaded into a corresponding scanning line to open a row of sub pixels connected to the scanning line, a data signal is written into the opened sub-pixel row, and the corresponding sub-pixel row emits light. The plurality of effective GOA units 11 are arranged in cascade. In the embodiment, each of the effective GOA units 11 is electrically connected to one of the clock signal lines CK. Specifically, each of the effective GOA units 11 can also be electrically connected to the plurality of clock signal lines CK, which can be adjusted as needed by those skilled in the art and are not limited in the present application.

In the embodiment, the plurality of GOA units 10 include a plurality of virtual GOA units 12, and a number of the virtual GOA units 12 is equal to the number of clock signal lines CK. The virtual COA units 12 are connected to the clock signal lines CK in a one-to-one correspondence. Compared with an existing technology that a number of the virtual GOA units 12 is not equal to the number of clock signal lines CK, such a design is conductive to preventing the difference in capacitance and resistance between the clock signal lines CK due to different loads, and improving the matching degree of the capacitance and the resistance between the clock signal lines CK.

FIG. 1 only shows a part of the effective GOA units 11 and a part of the virtual GOA units 12 as an example of the embodiment. In actual applications, technicians can adjust a number of the effective GOA units 11 and the number of the virtual GOA units 12 according to needs of different products.

In the embodiment of the present application, the array substrate with 12 of the clock signal lines CK is taken as an example in FIG. 1. The array substrate provided in the embodiment of the present application does not limit the number of the clock signal lines CK. For example, it can also be applied to an array substrate with 8 of the clock signal lines, or to an array substrate with 6 of the clock signal lines. The clock signal lines CK of the 12CK array substrate include a CK1, a CK2, a CK3, a CK4, a CK5, a CK6, a CK7, a CK8, a CK9, a CK10, a CK11, and a CK12. Wherein, resistance and capacitance between adjacent two clock signal lines from the CK1 to the CK12 are same, which is realized by setting the virtual GOA units 12 with a same number of the clock signal lines CK, that is, 12 of the virtual GOA units 12. Wherein, the 12 virtual GOA units 12 are connected to the CK1, the CK2, the CK3, the CK4, the CK5, the CK6, the CK7, the CK8, the CK9, the CK10, the CK11, and the CK12 in a one-to-one correspondence, making the resistance and the capacitance between the 12 clock signal lines CK match. In addition, since the CK12 needs to cross lines from the CK1 to the CK11 when connected to the GOA units 10, and the CK1 does not need to cross other clock signal lines CK, therefore, a length of the clock signal branch line 22 of the CK1 is shortest and a length of the clock signal branch line 22 of the CK12 is longest if compensation is not performed. This will lead to a difference in the capacitance and resistance of each of the clock signal lines CK from the CK1 to the CK12.

Figure 2:
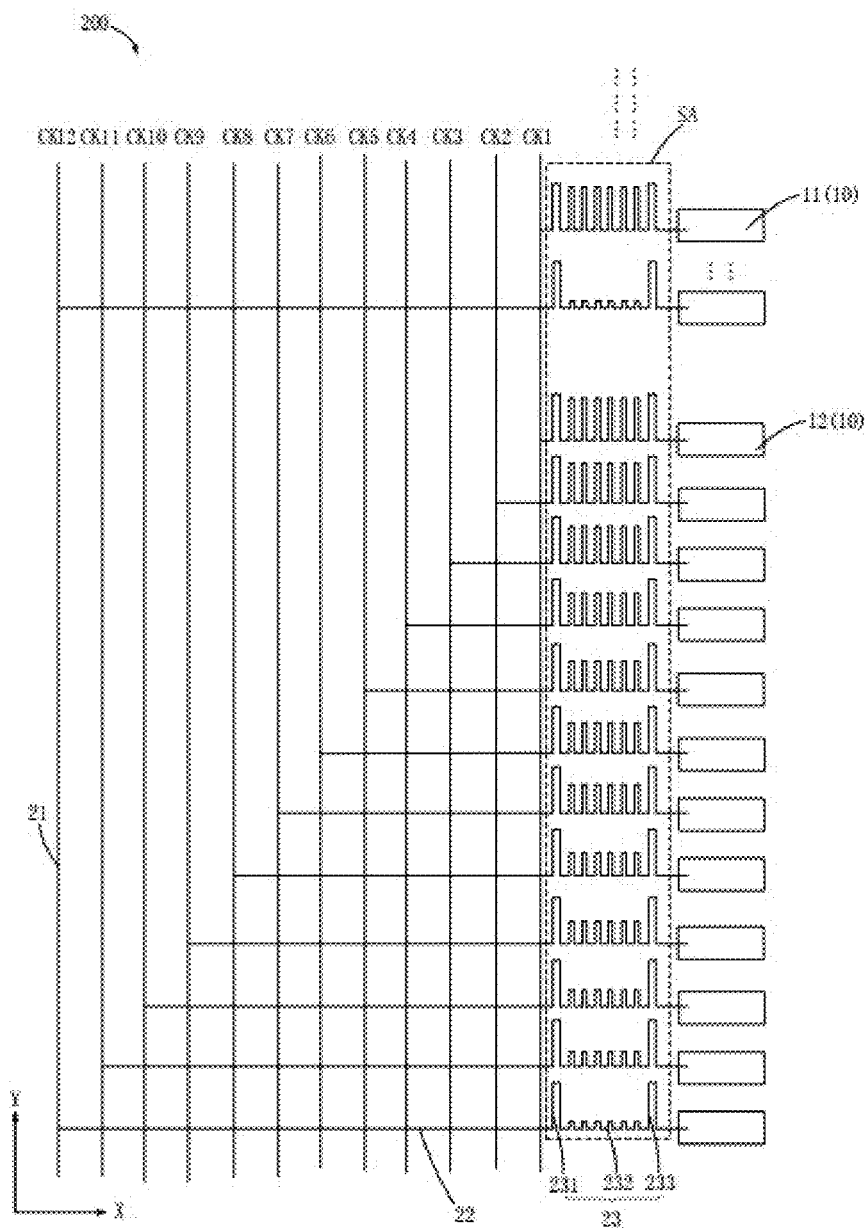
FIG. 2 is a second schematic structural diagram of the array substrate provided in a second embodiment of the present application.

As a specific embodiment of the present application, please refer to FIG. 2, FIG. 2 is a second schematic structural diagram of the array substrate provided in a second embodiment of the present application. As shown in FIG. 2, the array substrate 200 is provided in the embodiment of the present application. A difference between the array substrate 200 and the array substrate 100 is that: at least one of the clock signal lines CK further includes a compensation branch line 23. One end of the compensation branch line 23 is electrically connected to a corresponding clock signal branch line 22, and another end of the compensation branch line 23 is electrically connected to a corresponding GOA unit 10.

In the embodiment of the present application, the array substrate 200 further includes a plurality of GOA units in cascade 10 and a plurality of clock signal lines CK. The plurality of clock signal lines CK are arranged on one side of the GOA units 10 and are arranged at intervals along a direction away from the GOA units 10. The plurality of GOA units 10 are electrically connected to the plurality of clock signal lines CK, respectively. Wherein, a number of the GOA units 10 electrically connected to each of the clock signal lines CK is equal.

In the embodiment of the present application, at least one of the clock signal lines CK includes a clock signal main line 21 and a clock signal branch line 22 corresponding to the clock signal main line 21. One end of the clock signal branch line 22 is electrically connected to the corresponding clock signal main line 21, and another end of the clock signal branch line 22 is electrically connected to a corresponding GOA unit 10.

Specifically, the array substrate 200 includes the plurality of clock signal lines CK arranged at intervals along the direction away from the GOA units 10. Wherein, the clock signal line CK includes the clock signal main line 21 and the clock signal branch line 22. The plurality of clock signal main lines 21 are arranged at intervals along a first direction x. Preferably, the plurality of clock signal main lines 21 are parallel to each other. The plurality of clock signal branch lines 22 corresponding to the plurality of clock signal main lines 21 are arranged at intervals along a second direction y. Preferably, the plurality of clock signal branch lines 22 are parallel to each other.

In the embodiment of the present application, the clock signal branch lines 22 are connected to a plurality of effective GOA units 11 and a plurality of virtual GOA units 12 in a one-to-one correspondence. Distances between the clock signal main lines 21 and the corresponding GOA units 10 are different, that is, lengths of the clock signal branch lines 22 are different. Specifically, the longer the length of the clock signal branch line 22 is, the greater resistance is, and the greater a voltage drop value is; on the contrary, the smaller the voltage drop value is. Therefore, a length of a clock signal branch line 22 closest to the corresponding GOA unit 10 is shortest, its corresponding resistance is smallest, and the voltage drop value is least. In the present application, the compensation branch line 23 is set between the corresponding clock signal main line 21 and the corresponding GOA unit 10, and a length of the compensation branch line 23 is negatively correlated with the distance between the corresponding clock signal main line 21 and the corresponding GOA unit 10, so as to balance a resistance difference caused by a length difference of lines between the clock signal main line 21 and the GOA unit 10. It should be noted that the first direction x is a row direction of pixel units arranged in an array on the array substrate, and the second direction y is a column direction of the pixel unit.

In the embodiment of the present application, a winding area SA is provided between the GOA units 10 and the clock signal lines CK, and the compensation branch line 23 is arranged in the winding area SA. Such a design is conducive to saving a layout space, and since the winding area SA is provided without a conductive film layer, mutual interference of electrical signals between the GOA units 10 and the compensation branch lines 23 can be prevented. An area of the winding area SA is larger than an area occupied by the compensation branch line 23, so as to further prevent the mutual interference of the electrical signals between the GOA unit 10 and the compensation branch line 23.

In the embodiment of the present application, the compensation branch line 23 includes a first connecting section 231, a bending-connecting section 232, and a second connecting section 233. The first connecting section 231 is electrically connected to the corresponding clock signal branch line 22. The second connecting section 233 is electrically connected to the corresponding GOA unit 10. The bending-connecting section 232 is arranged in the winding area SA, and the bending-connecting section 232 is arranged between the first connecting section 231 and the second connecting section 233.

It should be noted that the compensation branch line 23 can be winded in a zigzag manner or winded in other shapes. For example, it can be an irregular bending curve. A shape of the compensation branch line 23 shown in FIG. 2 is only for illustration, not for limitation. The compensation branch line 23 can realize compensation for a length difference between the clock signal branch lines 22 between the plurality of clock signal lines CK and compensation for an overlapping area difference with other metal layers. In addition, the compensation branch line 23 can be a winding section, and can also include a plurality of winding sections. When the plurality of winding sections are included, the plurality of winding sections can be arranged at equal intervals or unequal intervals, which is not limited in this embodiment.

In the embodiment of the present application, the compensation branch line 23 and the clock signal line CK are arranged in different layers. The first connecting section 231 of the compensation branch line 23 and the second connecting section 233 of the compensation branch line 23 are arranged in different layers with the corresponding clock signal line CK. Such a design is conducive to reducing signal interference between metal signal lines and improving performance of the array substrate.

In the embodiment of the present application, the array substrate with 12 of the clock signal lines CK are taken as an example for illustration. The clock signal lines CK of the array substrate with 12 clock signal lines include a CK1, a CK2, a CK3, a CK4, a CK5, a CK6, a CK7, a CK8, a CK9, a CK10, a CK11, and a CK12. Wherein, resistance and capacitance between adjacent two of the clock signal lines CK from CK1 to the CK12 are same, which is realized by setting a plurality of virtual GOA units 12 with a same number of the clock signal lines CK and arranging the compensation branch line 23 between the clock signal main lines 21 and the GOA unit 10.

In the embodiment of the present application, a length of the compensation branch line 23 is negatively correlated with a distance between the clock signal main line 21 and the virtual GOA unit 12. Furthermore, a length of the clock signal branch lines 22 between the clock signal main lines 21 and the GOA units 10 is equal to a sum of lengths of the compensation branch lines 23. Specifically, a length of the clock signal branch line 22 corresponding to the CK1 is shortest, and a length of the clock signal branch line 22 corresponding to the CK12 is longest; a length of a compensation branch line 23 corresponding to the CK1 is longest, and an area of the winding area SA corresponding to the CK1 is largest. Preferably, the CK12 does not have a compensation branch line 23, or a length of a compensation branch line 23 corresponding to the CK12 is shortest, and an area of the winding area SA corresponding to the CK12 is smallest. Such a design is conducive to preventing a difference in capacitance and resistance between adjacent two clock signal lines from the CK1 to the CK12, and realizing complete matching of the capacitance and the resistance from the CK1 to the CK12.

In the embodiment of the present application, a width of each of the clock signal lines CK is same, and such a design is conducive to reducing the difference in the capacitance and the resistance between the clock signal lines CK, and further improving the matching degree of the capacitance and the resistance between the plurality of clock signal lines CK.

In the embodiment of the present application, a distance between any adjacent two of the clock signal lines CK is same. Such a design is conducive to making capacitive coupling of adjacent two of the clock signal lines consistent, making current peaks of the adjacent two of the clock signal lines equal, and preventing overheating of a display panel caused by excessive local currents of the display panel.

Figure 3:
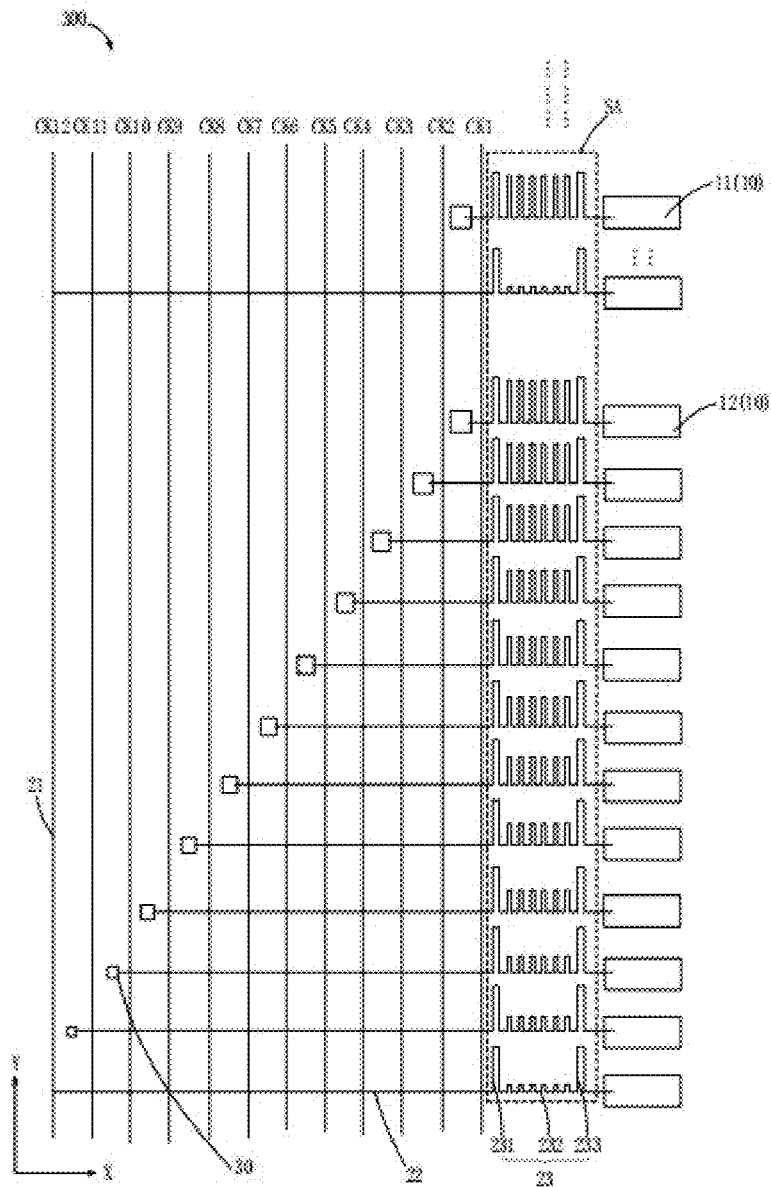
FIG. 3 is a third schematic structural diagram of the array substrate provided in a third embodiment of the present application.
Figure 4:
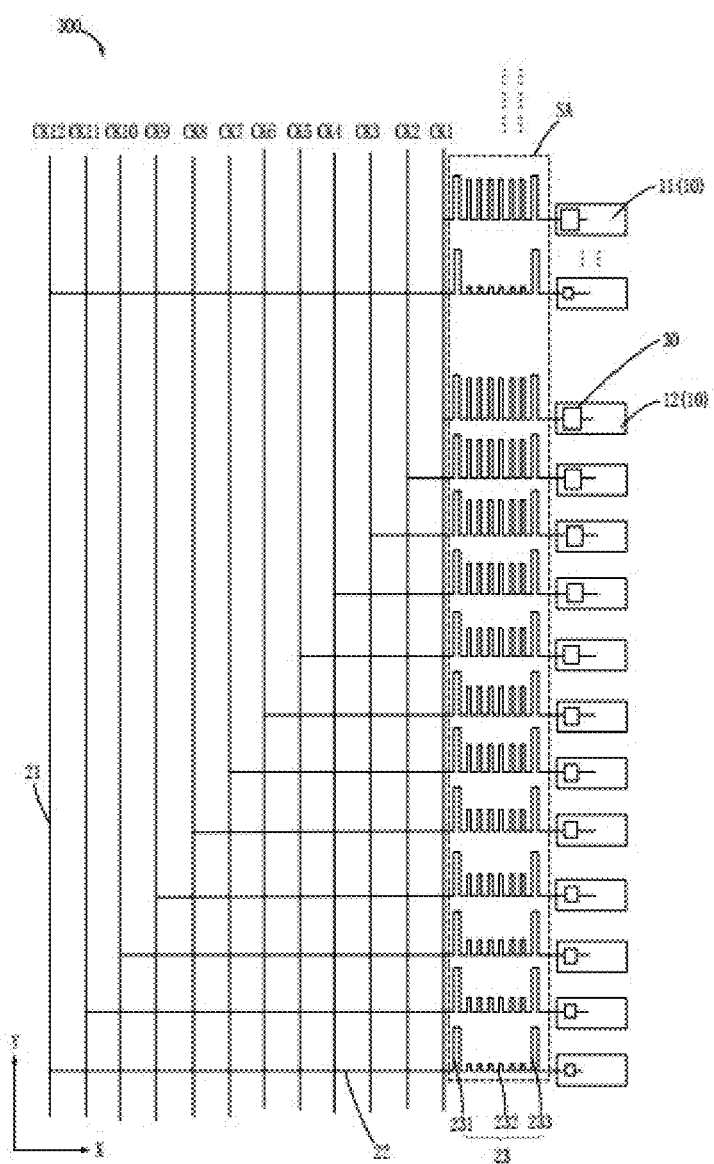
FIG. 4 is a fourth schematic structural diagram of the array substrate provided in a fourth embodiment of the present application.

As a specific embodiment of the present application, please refer to FIG. 3 and FIG. 4, FIG. 3 is a third schematic structural diagram of the array substrate provided in a third embodiment of the present application. FIG. 4 is a fourth schematic structural diagram of the array substrate provided in a fourth embodiment of the present application. As shown in FIG. 3 and FIG. 4, an array substrate 300 is provided in an embodiment of the present application. A difference between the array substrate 300 and the array substrate 200 is that: the GOA units 10 further includes a capacitance compensation block 30, and the capacitance compensation block 30 is electrically connected to a compensation branch line 23.

In the embodiment of the present application, by setting the capacitance compensation blocks 30, lateral capacitance formed by a plurality of clock signal branch lines 22 and corresponding clock signal main lines 21 are equal, and/or lateral capacitance formed by a plurality of second connecting sections 233 and the corresponding GOA units 10 are equal, respectively. The lateral capacitance refers to capacitance generated in an area directly opposite to the clock signal branch line 22 and lines in the corresponding GOA unit 10 or the corresponding clock signal main line 21.

In the embodiment of the present application, the array substrate 300 further includes a plurality of GOA units in cascade 10 and a plurality of clock signal lines CK. The plurality of clock signal lines CK are arranged on one side of the GOA units 10 and are arranged at intervals along a direction away from the GOA units 10. The plurality of GOA units 10 are electrically connected to the plurality of clock signal lines CK, respectively. Wherein, a number of the GOA units 10 electrically connected to each of the clock signal lines CK is equal.

In the embodiment of the present application, at least one of the clock signal lines CK includes a clock signal main line 21 and a clock signal branch line 22 corresponding to the clock signal main line 21. One end of the clock signal branch line 22 is electrically connected to the corresponding clock signal main line 21, and another end of the clock signal branch line 22 is electrically connected to a corresponding GOA unit 10.

In the embodiment, at least one of the clock signal lines CK further includes a compensation branch line 23, one end of the compensation branch line 23 is electrically connected to the clock signal branch line 22, and another end of the compensation branch line 23 is electrically connected to the GOA unit 10. A length of the compensation branch line 23 is negatively correlated with a distance between the clock signal main line 21 and the GOA unit 10, so as to balance a resistance difference caused by a length difference of lines between the clock signal main line 21 and the GOA unit 10. It should be noted that the first direction x is a row direction of pixel units arranged in an array on the array substrate, and the second direction y is a column direction of the pixel unit.

In the embodiment of the present application, a winding area SA is provided between the GOA units 10 and the clock signal lines CK, and the compensation branch line 23 is arranged in the winding area SA. The compensation branch line 23 includes a first connecting section 231, a bending-connecting section 232, and a second connecting section 233. The first connecting section 231 is electrically connected to the clock signal branch line 22. The second connecting section 233 is electrically connected to the GOA unit 10. The bending-connecting section 232 is arranged in the winding area SA and is arranged between the first connecting section 231 and the second connecting section 233.

In the embodiment of the present application, the array substrate with 12 clock signal lines CK are taken as an example for illustration in FIG. 3 and FIG. 4. The clock signal lines CK of the array substrate with 12 of the clock signal lines include a CK1, a CK2, a CK3, a CK4, a CK5, a CK6, a CK7, a CK8, a CK9, a CK10, a CK11, and a CK12. Wherein, resistance and capacitance between adjacent two of the clock signal lines CK from CK1 to the CK12 are same, which is realized by setting a plurality of virtual GOA units 12 with a same number of the clock signal lines CK and the compensation branch line 23 arranged between the clock signal main line 21 and the GOA unit 10.

In the embodiment of the present application, a length of the compensation branch line 23 is negatively correlated with a distance between the clock signal main line 21 and the virtual GOA unit 12. Furthermore, a length of the clock signal branch lines 22 between the clock signal main lines 21 and the GOA units 10 is equal to a sum of lengths of the compensation branch lines 23. Specifically, a length of the clock signal branch line 22 corresponding to the CK1 is shortest, and a length of the clock signal branch line 22 corresponding to the CK12 is longest; a length of a compensation branch line 23 corresponding to the CK1 is longest, and an area of the winding area SA corresponding to the CK1 is largest. Preferably, the CK12 does not have a compensation branch line 23, or a length of a compensation branch line 23 corresponding to the CK12 is shortest, and an area of the winding area SA corresponding to the CK12 is smallest. Such a design is conducive to preventing a difference in capacitance and resistance between adjacent two clock signal lines from the CK1 to the CK12, and realizing complete matching of the capacitance and the resistance from the CK1 to the CK12.

In the embodiment of the present application, a cross-sectional area of the capacitance compensation block 30 is negatively correlated with the distance between the clock signal main line 21 and the virtual GOA unit 12. Wherein, the capacitance compensation block 30 shown in FIG. 3 is arranged on one end of the clock signal branch line 22 and is arranged on a middle position of adjacent two clock signal main lines 21, so as to prevent causing inconsistent capacitive coupling between the adjacent two clock signal main lines 21. The capacitance compensation block 30 shown in FIG. 4 is arranged on the GOA unit 10 and is electrically connected to the second connecting section 233 of the compensation branch line 23. Specifically, an area of the winding area SA corresponding to the CK1 is larger, an area of the winding area SA corresponding to the CK12 is smaller, then lateral capacitance generated between the clock signal lines CK from the CK1 to the CK12 and the GOA unit 10, lateral capacitance generated between the clock signal lines CK from the CK1 to the CK12 and the clock signal lines CK are different. A difference in the lateral capacitance will also lead to a difference in output scanning signal waveform, which will cause a problem of bright and dark lines in a display panel. Therefore, the setting of the capacitance compensation blocks 30 is conducive to making the lateral capacitance equal, which is conducive to preventing practical problems of light and dark lines and improving a display effect.

Figure 5:
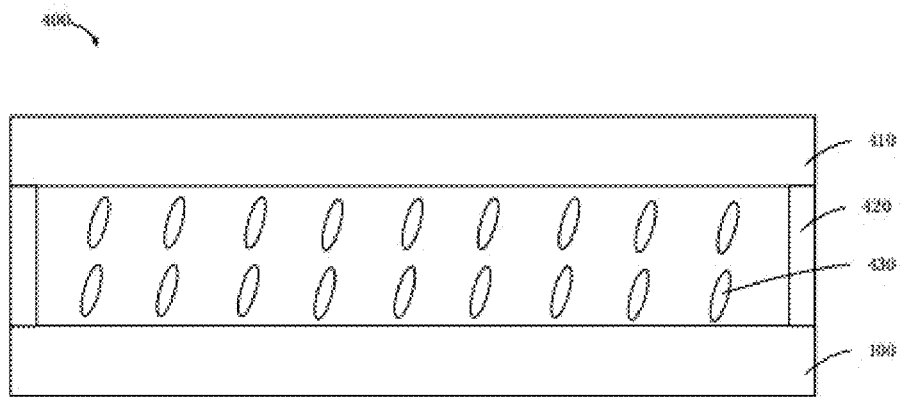
FIG. 5 is a schematic structural diagram of a display panel provided in an embodiment of the present application.

In another aspect, a display panel 400 is further provided in the present application. FIG. 5 is a schematic structural diagram of the display panel provided in an embodiment of the present application. As shown in FIG. 5, the display panel 400 in the present application is a liquid crystal display panel. The display panel 400 includes the above-mentioned array substrate 100/200/300 and a color film substrate 410. The color film substrate 410 is arranged opposite to the array substrate 100/200/300. Specifically, the display panel 400 further includes a glue frame 420 located between the array substrate 100/200/300 and the color film substrate 410 and a liquid crystal layer 430. In addition, the display panel in the present application can also be an organic light-emitting diode display panel including the above-mentioned array substrate 100/200/300.

The array substrate provided in the present application includes: the plurality of GOA units 10 in cascade and the plurality of clock signal lines CK. The plurality of clock signal lines CK are arranged on one side of the GOA units 10 and are arranged at intervals along the direction away from the GOA units 10. The plurality of GOA units 10 are electrically connected to the plurality of signal clock signal lines CK, respectively. Wherein, the number of the GOA units 10 electrically connected to each of the clock signal line CK is equal. The array substrate provided by the present application adjusts the number of stages of the GOA units 10 to make the number of the GOA units 10 electrically connected to each of the clock signal lines CK equal, thereby reducing the resistance difference and the capacitance difference between the plurality of clock signal lines CK, alleviating the problem of dense horizontal lines, and improving the display effect.

The above-mentioned describes the array substrate and display panel provided by the embodiments of the present application in detail. In this paper, specific examples are applied to explain the principle and implementation mode of the application. The description of the above-mentioned embodiment is only used to help understand the method and core idea of the application. At the same time, for those skilled in the art, according to the idea of the present application, there will be changes in the specific implementation mode and scope of application. In conclusion, the contents of the specification should not be understood as restrictions on the application.

What is claimed is:

1. An array substrate, comprising:
a plurality of gate driver on array (GOA) units in cascade; and
a plurality of clock signal lines arranged on one side of the GOA units and arranged at intervals along a direction away from the GOA units, and the plurality of GOA units electrically connected to the plurality of clock signal lines, respectively; wherein a number of the GOA units electrically connected to each of the clock signal lines is equal,
wherein at least one of the clock signal lines comprises a clock signal main line and a clock signal branch line corresponding to the clock signal main line; one end of the clock signal branch line is electrically connected to the corresponding clock signal main line, and another end of the clock signal branch line is electrically connected to a corresponding GOA unit,
wherein at least one of the clock signal lines further comprises a compensation branch line; one end of the compensation branch line is electrically connected to the corresponding clock signal branch line, and another end of the compensation branch line is electrically connected to the corresponding GOA unit,
wherein a sum of lengths of the plurality of clock signal branch lines is equal to a sum of lengths of the compensation branch lines.

2. The array substrate as claimed in claim 1, wherein the GOA units are electrically connected to at least one of the clock signal lines, and a number of the GOA units is N times of a number of the clock signal lines, and N is an integer greater than or equal to 1.

3. The array substrate as claimed in claim 2, wherein the plurality of GOA units comprise a plurality of virtual GOA units, a number of the virtual GOA units is equal to the number of the clock signal lines, and the virtual GOA units are connected to the clock signal lines in a one-to-one correspondence.

4. The array substrate as claimed in claim 3, wherein the compensation branch line comprises a first connecting section electrically connected to the corresponding clock signal branch line, a bending-connecting section, and a second connecting section electrically connected to the corresponding virtual GOA unit; and the bending-connecting section is arranged between the first connecting section and the second connecting sections.

5. The array substrate as claimed in claim 1, wherein a winding area is provided between the GOA units and the clock signal lines, and the compensation branch line is arranged in the winding area.

6. The array substrate as claimed in claim 1, wherein the array substrate further comprises a plurality of capacitance compensation blocks, the plurality of capacitance compensation blocks are electrically connected to the plurality of clock signal lines and are used to compensate capacitance generated in an area directly opposite to the plurality of clock signal branch lines and lines in the GOA units, and/or capacitance generated in an area directly opposite to the plurality of clock signal branch lines and the clock signal main lines.

7. The array substrate as claim in claim 6, wherein a cross-sectional area of the capacitance compensation block is negatively correlated with the distance between the clock signal main line and the virtual GOA unit.

8. A display panel, comprising the array substrate as claimed in claim 1.

* * * * *